(12) United States Patent
Hawk

(10) Patent No.: US 6,550,281 B1
(45) Date of Patent: *Apr. 22, 2003

(54) METHOD FOR PROVIDING CONTROLLED SPIN IN OPTICAL FIBER

(75) Inventor: Robert M. Hawk, Pawleys, SC (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 459 days.

(21) Appl. No.: 09/117,280

(22) PCT Filed: Feb. 19, 1997

(86) PCT No.: PCT/US97/02541
§ 371 (c)(1),
(2), (4) Date: Jul. 24, 1998

(87) PCT Pub. No.: WO97/30945
PCT Pub. Date: Aug. 28, 1997

Related U.S. Application Data

(60) Provisional application No. 60/012,290, filed on Feb. 26, 1996.

(51) Int. Cl.[7] ................................ C03B 37/12
(52) U.S. Cl. ................ 65/402; 65/504; 57/335; 57/293
(58) Field of Search .................. 57/293, 334, 335, 57/336; 65/402, 504

(56) References Cited

U.S. PATENT DOCUMENTS

| | | | | | |
|---|---|---|---|---|---|
| 3,659,408 | A | * | 5/1972 | Burr | 57/293 |
| 4,056,925 | A | * | 11/1977 | Vogelsberg | 57/293 |
| 4,144,700 | A | * | 3/1979 | Takai | 57/336 |
| 4,182,107 | A | * | 1/1980 | Carter et al. | 57/293 |
| 4,328,664 | A | * | 5/1982 | Vogelsberg | 57/293 |
| 4,377,932 | A | * | 3/1983 | Dammann et al. | 57/336 |
| 4,427,717 | A | * | 1/1984 | Gauthier | 427/163.2 |
| 4,548,631 | A | * | 10/1985 | Arditty et al. | 65/402 |
| 5,092,117 | A | * | 3/1992 | Paivinen et al. | 57/293 |
| 5,298,047 | A | * | 3/1994 | Hart, Jr. et al. | 65/432 |

* cited by examiner

Primary Examiner—John Hoffman
(74) Attorney, Agent, or Firm—Randall S. Wayland; Edward V. Charbonneau

(57) ABSTRACT

A fiber (106) having low polarization mode dispersion is made by heating the end of a preform (100) with a furnace (101). The fiber is drawn from the heated end. The fiber passes between two rollers (102, 104). As the fiber passes therebetween, the angular tilt of each of the rollers is changed so that a spin is imparted to the fiber.

10 Claims, 3 Drawing Sheets

METHOD FOR PROVIDING CONTROLLED SPIN IN OPTICAL FIBER

This application claims the benefit of Provisional application Serial No. 60/012,290, filed Feb. 26, 1996.

BACKGROUND OF THE INVENTION

This invention relates to methods for introducing controlled spin in single mode optical fiber so as to reduce polarization mode dispersion (PMD).

It is well known that the so-called "single mode fiber" that is commonly used in communication systems is not purely single mode. Rather, when light at a particular wavelength propagates through a single mode fiber, two modes, with perpendicular polarizations, exist in the fiber. Light that propagates through a single mode fiber can be represented by a linear superposition of these two modes. If the fiber is perfectly circularly symmetric, in geometric and in stress symmetries, the two polarization modes are degenerate. They propagate with the same group velocity and have no time delay difference after traveling the same distance in the fiber. However, an actual fiber is not perfectly circularly symmetric. Any circular asymmetry which alters the propagation constant of the fiber with respect to the two orthogonal modes breaks the degeneracy of the two modes. These asymmetries may be geometric or stress induced. As a result, the two polarization modes propagate with different propagation. constants. The difference between the propagation constants is termed birefringence. The birefringence causes a general polarization state to evolve periodically along the fiber. The length over which the polarization state is reproduced is the fiber beat length, which is inversely proportional to the fiber birefringence. When birefringence is present, the two polarization modes travel at different group velocities. The differential time delay between the two polarization modes is called polarization mode dispersion, or PMD. PMD causes signal distortion which is very harmful for high bit rate systems and analog communication systems.

It is also known that PMD may be reduced if the polarization modes "couple." Mode coupling occurs when the light energy from one polarization mode couples to the other polarization mode. This occurs if the longitudinal uniformity of the fiber is not perfect. Such longitudinal uniformity can be disrupted by errors in core circularity in preform fabrication or the drawing process, or by bends and twists when the fiber is deployed.

The present invention provides a method and apparatus for spinning fiber about its longitudinal axis, while it is being drawn, to form rotational non-uniformities in the fiber.

SUMMARY OF THE INVENTION

It is an object of the present invention to provide a method for reducing PMD.

It is a further object of the present invention to provide a controllable and predictable method and apparatus for spinning fiber during the drawing process.

It is an object of the present invention to provide a method for reducing PMD in a fiber, when it is used, by spinning the fiber in a controllable and predictable manner during the fiber drawing process, so as to cause mode coupling when the resultant fiber is used.

The above objects are achieved by the present invention.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
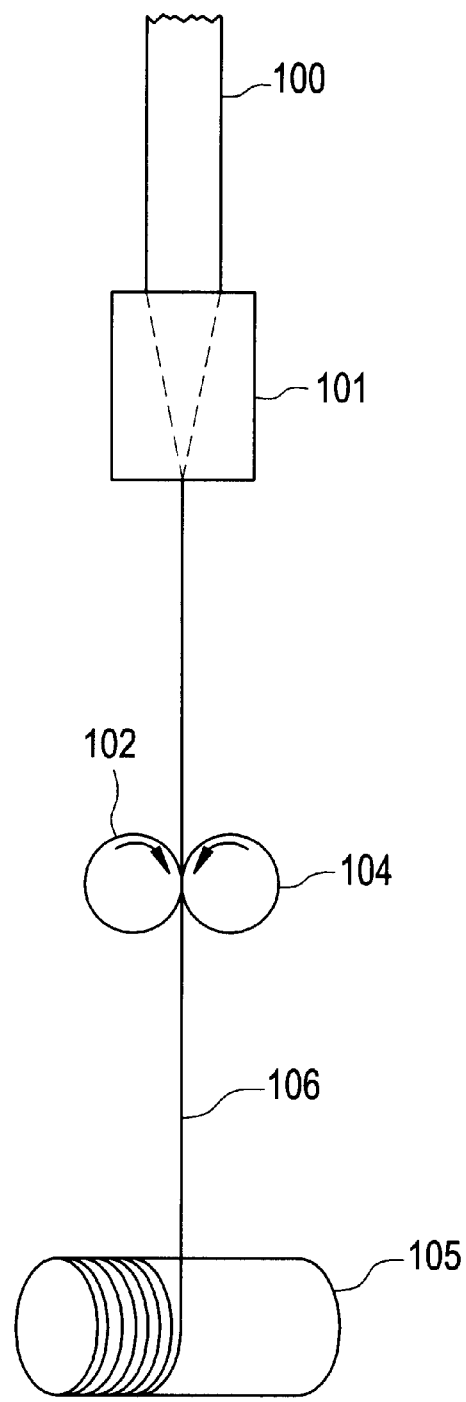
FIG. 1 is a diagram illustrating a conventional method for drawing fiber between two rollers.

The invention provides a method of making optical fiber having reduced PMD by drawing the fiber through rollers so as to impart a controllable and predictable spin to the fiber during the drawing process. More specifically, this means heating a conventional fiber preform to a conventional draw temperature, and drawing optical fiber from the preform by drawing the fiber between a rotating belt and pulley, or by drawing the fiber between rollers such that a controllable and predictable spin is imparted on the fiber.

FIG. 1 illustrates a conventional method for drawing single mode optical fiber 106 from a glass preform 100, which is heated in a furnace, 101, and drawn from the furnace, preferably at a constant draw speed, by a pull-down reel 105, such that the fiber passes between two rollers 102 and 104 which each freely rotate. The rollers are juxtaposed so that the fiber is sandwiched between the rollers and the rollers are preferably urged toward each other. In this manner, the fiber frictionally engages the surface of each roller and thereby, in the preferred embodiment in which the roller are not motor driven, the fiber causes each roller to rotate. The degree of frictional contact should be sufficient to ensure that the surface speed of each roller is substantially equal to the linear (draw) speed of the fiber. However, the roller should not grip or engage the fiber so tightly as to overly stress the fiber. If the rollers are rotationally driven, it is then important to ensure that the rotation drive speed is controlled so that the vertical component of the surface speed of the rollers is substantially equal to the draw speed of the fiber.

In the method illustrated in FIG. 1, the fiber does not rotate. Rather, the axis of rotation of each roller, which passes through the center of the roller, is kept parallel to the other, and perpendicular to the fiber, to prevent rotation of the fiber 106 about its axis. Examination of the fiber rotation rate, or spin rate, caused by non-parallelism in the rollers reveals the following mathematical description relating the spin rate $\Omega$, in units of angular rotation per unit length (rad./m), to the angular alignment of the rollers, measured by the angle formed between the fiber and a line parallel to the axis of the roller drawn along the surface of the roller and passing through the point of contact between the surface of the roller and the fiber ($\psi$), and the fiber radius, a:

$$\Omega = (\sin \psi)/a \quad (1)$$

or, in terms of turns/m, $$\Omega = (\sin \psi)/2\pi a \quad (2)$$

If the rollers are parallel and each axis is perpendicular to the fiber, then the fiber will not be spun. If only one roller deviates from the parallel position, then the fiber will spin and its position along the roller will move toward an end of that roller. The fiber moves in the direction of the smaller angle between the roller and the fiber. However, if both rollers deviate by the same angle to the fiber but in opposite directions, then the fiber will spin, but its position along the roller will remain constant. Thus, a characteristic of my invention is the use of two rollers, each of which frictionally engages the fiber and is preferably driven by the fiber. As a result, the fiber may be spun without displacing it from its vertical path.

To illustrate the sensitivity of my invention, the fiber radius "a" is typically about 125 microns ($1.25 \times 10^{-4}$ meters), i.e. a plastic coated optical fiber having a diameter of 250 microns. Substituting this value of "a" (175 microns) in Eq. (2) above illustrates that for $\psi=1$ degree, $\Omega=22.6$ turns/meter. Thus, it will be seen that a small change in the angle $\psi$ will introduce a large spin. Angular accuracies of <0.007 degrees are easily attainable with a micro-stepping motor having a resolution of 50,000 steps/revolution.

Figure 2:
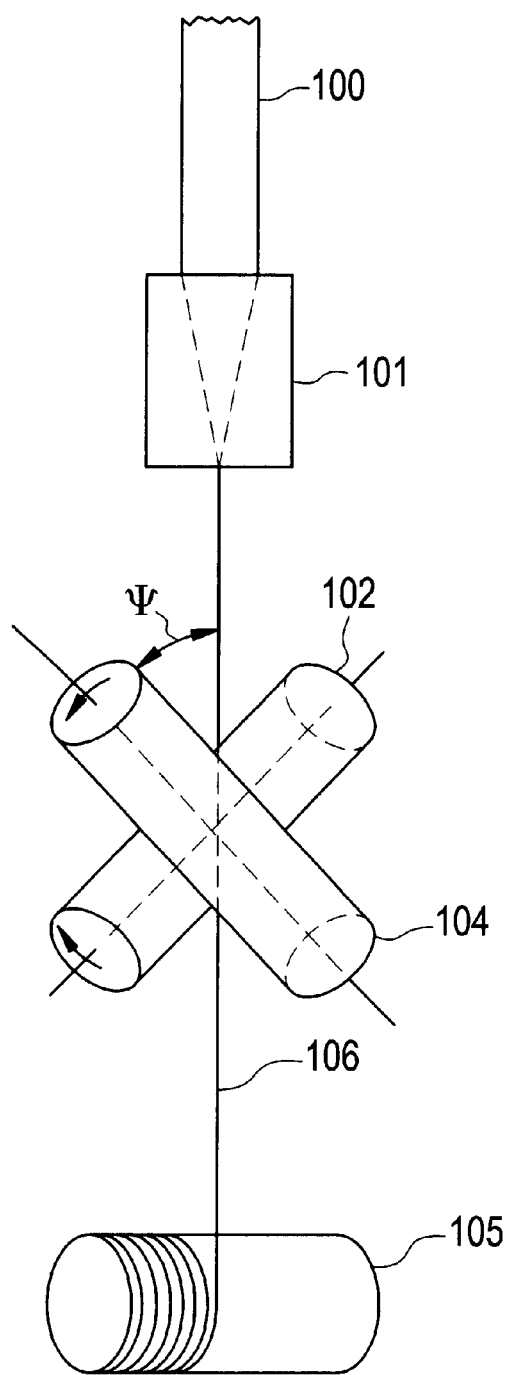
FIG. 2 is a diagram illustrating fiber being drawn through two rollers in accordance with an embodiment of the present invention.

FIG. 2 illustrates a preferred embodiment of the present invention. A single mode optical fiber 106 is drawn from a heated glass preform 100, having a substantially uniform diameter, at a substantially constant draw speed. The fiber 106 passes between two rollers 102 and 104, which rotate equally and oppositely to each other. The rotation of rollers 102 and 104 may be powered, but are preferably freely rotating. A control mechanism is provided to modulate the angular alignment of the rollers 102 and 104 as needed to impart a particular spin. The angular alignment is measured between the fiber and the axis of rotation of the roller. At any given time, each roller deviates from the parallel position such that the angles measured between the fiber and the axis of rotation of each roller are equal in magnitude and opposite in direction. Since one roller has an equal angular velocity and opposite direction of angular alignment from the other at all times, the direction of the spin rate introduced in the fiber will reverse as one roller reverses its direction of angular alignment.

The change in angular alignment of the rollers causes the fiber to rotate or spin about its longitudinal axis during the fiber drawing process. The spin $\Omega$ imparted to the fiber is proportional to the angle between the axis of the rollers, as indicated by the formula recited above. Thus, the spin imparted to the fiber is easily controllable by the modulation of the rollers.

Figure 3:
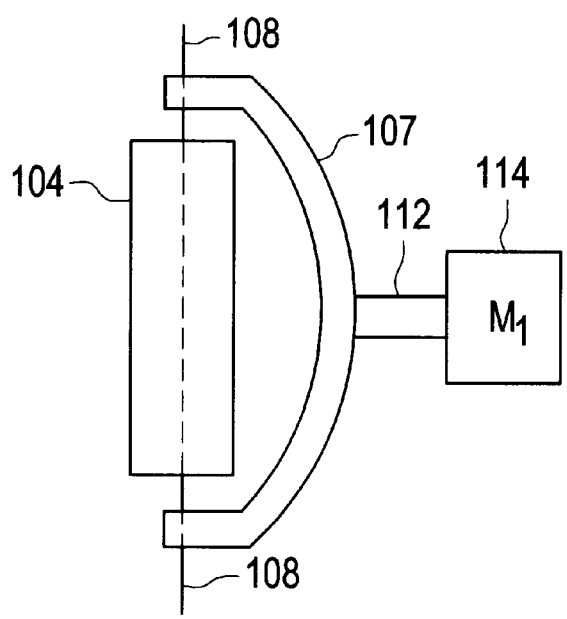
FIG. 3 shows an apparatus element used in the practice of my invention.

Considering a specific embodiment of my invention, FIG. 3 shows a top view of roller 104. Preferably, the roller surface is coated with an elastomeric material such as polyurethane to prevent damage to the coated fiber and to allow for small errors in roundness of the rollers. The hardness of this material is chosen so that the surface deforms elastically when the fiber passes over it. This provides a spring-like mechanism to provide means of assuring intimate contact between the roller(s) and the fiber being drawn.

Extending through the roller 104 is shaft 108 upon which the roller 104 freely rotates. Opposite ends of the shaft 108 are connected to the yoke 107 which, at the center thereof, is connected to an arm 112 which extends into the stepper motor 114. Thus, it will be seen that as the stepper motor 114 receives control pulses, the roller 104 rotates in a direction determined by the polarity of the pulse and the magnitude of the rotation is determined by the number of pulses. Motor 114 may also be provided with means to provide an output signal which indicates the angular orientation of the shaft, i.e. the degree and direction to which it has rotated in response to earlier received pulses. The roller 102 would be similarly configured and connected to its corresponding motor through a similar yoke and shaft.

Figure 4:
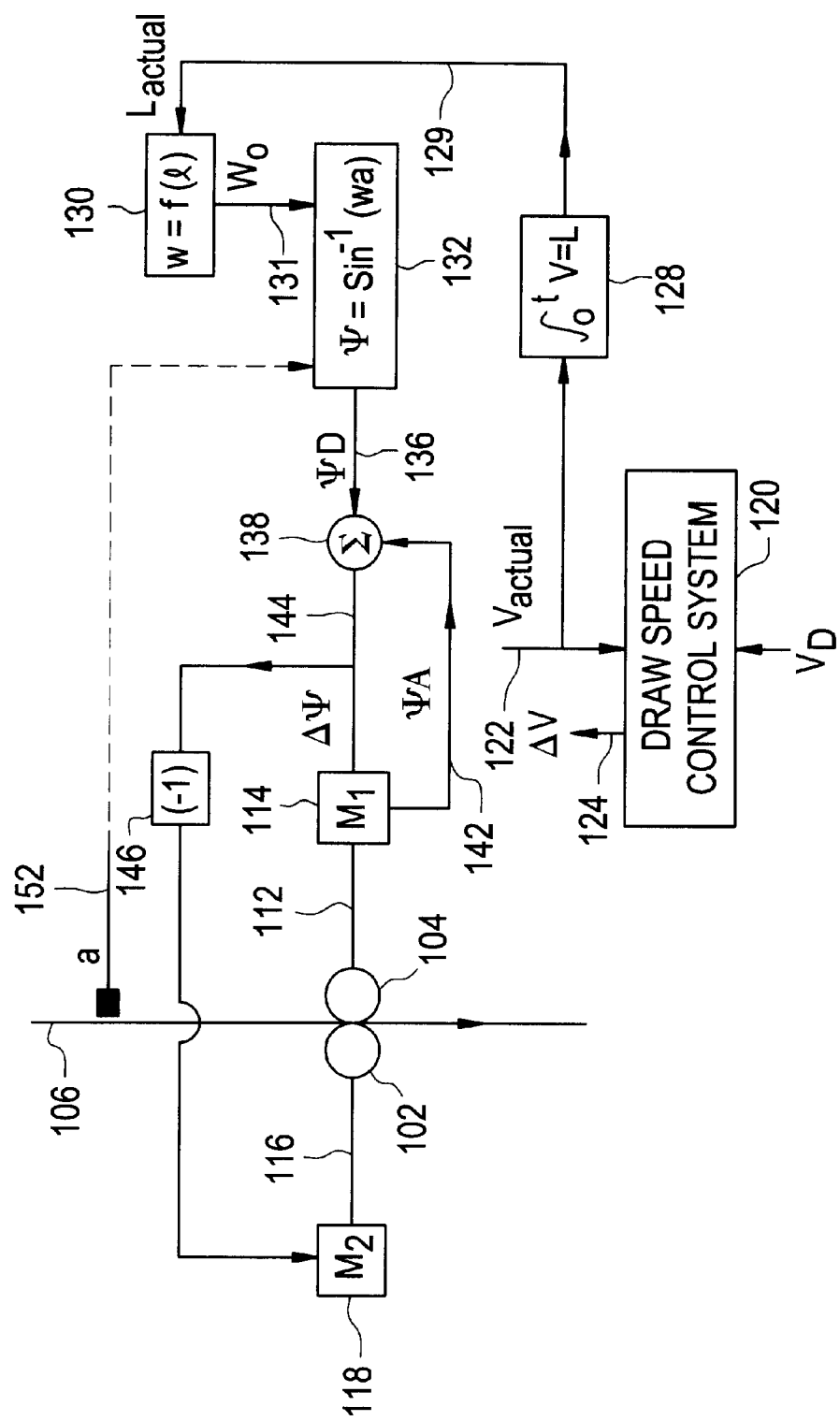
FIG. 4 is a functional schematic of a control system which embodies my invention.

Referring to FIG. 4, there is shown (functionally) a control system and process which embodies my invention and the use of rollers which would impart a spin to a fiber. More particularly, the control strategy reflected by the embodiment of my invention shown in FIG. 4 demonstrates one of its attributes, namely the ability to impress upon a fiber a desired spin which is a function of its length. Shown in FIG. 4 is a representative fiber 106 which passes between and frictionally engages rollers 102 and 104, which are each constructed and arranged as indicated in FIG. 3, namely their respective shafts upon which they rotate are connected by arms 112 and 116 to their respective motors 114 and 118. Also functionally shown in FIG. 4 is a Drawspeed Control System 120 which is conventional. In operation, the Control System 120 would receive a signal 122 obtained from a fiber draw speed measuring device and which represented the instantaneous speed of the fiber. Also supplied to Control System 120 is the desired fiber speed of $V_D$. The Control System 120 then provides an output 124 ($\Delta V$) which represents the desired change in the draw speed, so that $V_A=V_D$.

As indicated, the signal line carrying the signal $V_A$ is tapped and provided to integrator 128, which provides an output in the form of a signal representing, the length of fiber drawn with reference to some arbitrary time, t=0.

As an example of how my invention might be employed, assume it is desired that the spin impressed on the fiber should vary sinusoidally as a function of length. The desired variation of spin as a function of length is entered into computer 130, which receives, as its input, the signal 129 indicating the length of fiber actually drawn by the fiber drawing system. Using the designated functional relation, e.g. $\Omega_D=\sin L_A$, the computational element 130 calculates the desired spin rate, $\Omega_D$. This output signal is provided to the computational element (which may be a computer) 132.

As stated earlier, the operation of my dual roller system with respect to the rotation imparted to the fiber may be described by the equation $\Omega=(\sin \psi)/a$. By rearranging, it will be seen that $$\psi=\sin^{-1}(\Omega a)$$

Thus, this function is provided to the computational element 132, which receives the signal 131, and then computes the required angle $\psi$ to obtain the desired instantaneous spin. This is provided as output 136 which, if a feedback control system is used, may be provided to summing junction 138, which also receives the feedback signal 142 representing the actual displacement of the arm 112, the size of A. The output of the summing junction 144 is provided to multiplier 146 which simply reverses its polarity. Thereby, control signals $\Delta\psi$ and $-\Delta\psi$ are provided to motors 114 and 118 and the rollers 104, 102 respectively undergo angular repositioning whereby the desired spin rate, $\Omega D$, is impressed upon the fiber.

In the above description, it was assumed that the diameter of the fiber, a, remains constant. However, in accordance with my invention, the conventional fiber diameter measuring system found on most draws may be tapped to provide the signal 152 which may, as indicated by the dotted line in FIG. 4, be provided to the computational element 132 and included in the computation of the equation indicated.

As will be appreciated, through the practice of my invention, precise control of the instantaneous spin impressed on the fiber may be achieved.

The control mechanism is a programmable controller which preferably includes two motors, in which the first motor is connected to roller 102 and the second motor is connected to roller 104. The first motor controls the angular alignment of roller 102 as measured between the axis of rotation of the roller and the fiber. Similarly, the second motor controls the angular alignment of roller 104 as measured between the axis of rotation of the roller and the fiber. Preferably the invention uses stepper motors. A pulsing circuit is connected to each motor to move the motor. The greater the number of pulses needed per revolution, the greater the control of both the motor and the angular alignment of the rollers. The pulsing circuit may be driven by the output from a programmable device.

Thus a method for reducing PMD by imparting a controllable and predictable spin upon a fiber during the drawing process is provided. Although particular illustrative embodiments have been disclosed, persons skilled in the art will appreciate that the present invention can be practiced by other than the disclosed embodiments, which are presented for purposes of illustration, and not of limitation, and the present invention is limited only by the claims that follow.

What is claimed is:

1. A method of making an optical fiber from a preform, comprising:

heating at least a portion of the preform to a draw temperature;

drawing optical fiber from the preform so that the optical fiber passes between and contacts a first and second roller, each roller rotating about an axis of rotation passing longitudinally through the center of each roller; and pivoting said rollers with respect to each other during the drawing step such that the axes of rotation cross to become non-parallel and to impart a spin to the fiber without displacing the fiber from a vertical path at a point of contact with the first and second rollers.

2. The method of claim 1 further comprising the step of modulating the angular alignment of the first and second rollers with time.

3. The method of claim 2, wherein the spin imparted on the fiber is directly proportional to the modulation of the first and second rollers.

4. The method of claim 2 wherein a desired modulation of the angular alignment of the first and second rollers is programmed into a control mechanism.

5. The method of claim 1 wherein a desired angular alignment of the first and second rollers is programmed into a control mechanism.

6. The method of claim 1 wherein the optical fiber is drawn at a constant draw speed.

7. The method of claim 6 wherein the relation between the angular orientation of said rollers and the spin impressed on said fiber is substantially described by the relation $\Omega = (\sin \psi)/a$, where $\psi$ is the angle measured between the fiber and a line parallel to the axis of the roller alone the surface of the roller and passing through the point of contact between the surface of the roller and the fiber.

8. The method of claim 1 wherein the change of each axis of rotation of each roller is equal in magnitude but opposite in direction.

9. A method of making optical fiber, comprising:

heating a preform;

drawing optical fiber from the preform so that the optical fiber passes between and contacts a first and second roller, each roller rotating about an axis of rotation passing longitudinally through the center of each roller; and pivoting the rollers with respect to each other during the drawing step such that the axes of rotation cross to become non-parallel imparting spin to the fiber wherein a position of the fiber along a longitudinal length of the first and second rollers remains unchanged as spin is imparted.

10. A method of making optical fiber, comprising:

heating a preform;

drawing optical fiber from the preform;

passing the optical fiber between a first and a second roller, each roller rotating about a longitudinal axis of rotation thereof; and pivoting said rollers with respect to each other such that the axes of rotation become non-parallel and impart fiber spin but without deflecting a lateral position of the fiber at a point of contact with the first and second rollers.

* * * * *

UNITED STATES PATENT AND TRADEMARK OFFICE
CERTIFICATE OF CORRECTION

PATENT NO.    : 6,550,281 B1
DATED         : April 22, 2003
INVENTOR(S)   : Hawk Robert M, et al.

It is certified that error appears in the above-identified patent and that said Letters Patent is hereby corrected as shown below:

<u>Column 6,</u>
Line 10, "a line parallel to the axis of the roller alone the surface of the" should be
-- a line parallel to the axis of the roller along the surface of the --

Signed and Sealed this

Eleventh Day of November, 2003

JAMES E. ROGAN
*Director of the United States Patent and Trademark Office*